(No Model.)
J. HUNT & B. C. WILSON.
APPARATUS FOR BOTTLING LIQUORS.
No. 270,434. Patented Jan. 9, 1883.
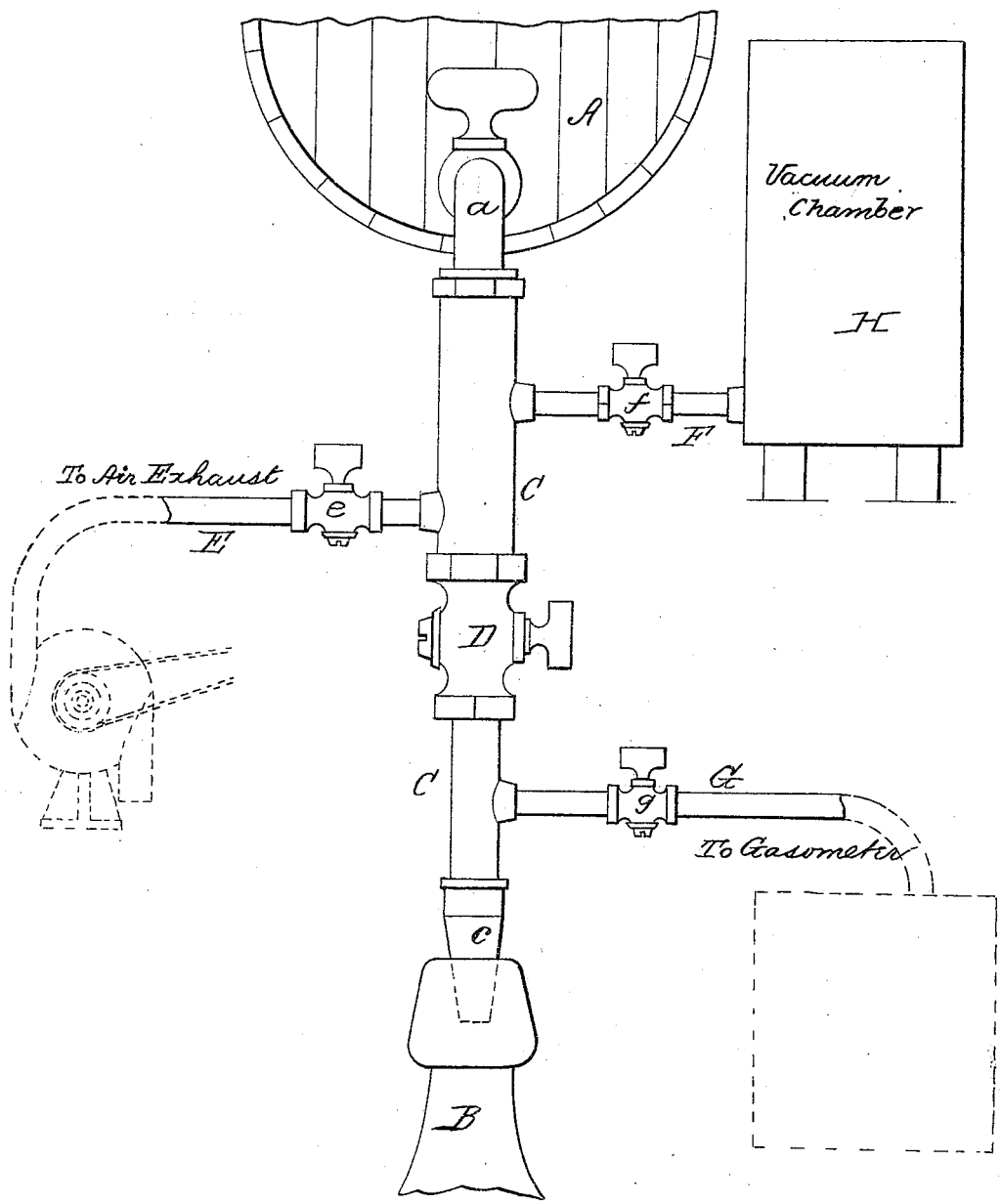
WITNESSES:
INVENTORS,
James Hunt
Bennet C. Wilson

UNITED STATES PATENT OFFICE.

JAMES HUNT AND BENNET C. WILSON, OF PHILADELPHIA, PENNSYLVANIA.

APPARATUS FOR BOTTLING LIQUORS.

SPECIFICATION forming part of Letters Patent No. 270,434, dated January 9, 1883.

Application filed October 28, 1881. (No model.)

*To all whom it may concern:*

Be it known that we, JAMES HUNT and BENNET C. WILSON, citizens of the United States, residing at the city and county of Philadelphia, in the State of Pennsylvania, have invented certain new and useful Improvements in Apparatus for Bottling Malt or other Liquors, of which the following is a specification, reference being had to the accompanying drawing, which represents an elevation of apparatus embodying our invention.

Our invention has relation to an improved apparatus for bottling beer or other malt liquors, and is especially adapted to that class of fillers used in what is known as the "vacuum" process of bottling beer.

Our invention has for its object to improve the apparatus used in such process, whereby the bottles may be completely filled at one operation.

Our invention accordingly consists in the provision of an air or vacuum chamber which has its contained air exhausted at the same time that the bottle or other vessel to be filled is exhausted of its air, so that when beer or other liquor is passed into said bottle, and when, owing to the compression of the attenuated air therein by said beer, the latter does not quite fill the bottle, communication is then made between the bottle and vacuum-chamber, whereupon such compressed air in the bottle then flows into said chamber, and the beer supplied to the bottle then rises therein to completely fill the same.

Referring to the accompanying drawing, we have shown an apparatus embodying our improvements, wherein A represents the barrel or vessel from which the beer or other malt or spirituous liquor is taken for bottling purposes. Attached to a spigot, $a$, in the vessel A is a pipe, C, and it runs down to and its lower end, $c$, fits snugly in the top of the bottle B, or in an opening in its stopper, so as to effect an air-tight joint therewith. Said pipe is provided with a cock, D, about half-way of its length—at least we prefer to so locate said cock; but the position thereof is not an arbitrary one, but may be placed at any desired point along or on said pipe. The latter is provided with branches E, F, and G. The branch E connects with an air-pump, exhaust, or other mechanism, $y$, for producing a vacuum or creating an exhaust in said tube and appurtenances. The branch F leads to a vessel, H, which we denominate the "vacuum-chamber." Said branches are provided with cocks $e f$, respectively, placed at any convenient location thereon, whereby they may be readily handled, as hereinafter described. The branch G passes to a gasometer or other vessel containing carbonic-acid gas or other charging compound designed to be introduced into the bottle after it has been filled. Said branch is furnished with a cock, $g$, as shown.

The operation is as follows: Said parts being arranged substantially as represented, the cocks $f e$ D are opened and the cock $g$ closed. The exhaust apparatus $y$ is then started, and air in bottle B, chamber H, and pipe C is exhausted therefrom until as nearly a perfect vacuum as may be is obtained therein. The cock $e$ is then closed, as is cock $f$, thereby closing communication between exhaust apparatus and pipe C, and also between the latter and vacuum-chamber. The spigot $a$ is then opened and beer from vessel A flows out therefrom through the pipe C to bottle B, wherein it rises until the attenuated air therein is compressed to such an extent that it stops the rise of said beer, whereupon the spigot $a$ is then closed, and the cock $f$ is then opened. Communication being then established between the vacuum-chamber and the bottle, such compressed air in the latter instantly passes into said vacuum-chamber. The cock $f$ is then again closed to shut off said communication. The spigot $a$ being then again opened, beer from vessel A flows into the bottle B until it is filled to any desired height. If it is desired to then charge said beer, the spigot $a$ and cock D are closed and cock $g$ opened, whereupon gas from the generator passes into the bottle B to charge its contained beer. When such operation is completed the cock $g$ is closed. The cock D is then opened, whereupon the gas in the bottle instantly acts to close the valve in the bottle-stopper, (not shown in the drawing,) and the bottle may then be withdrawn from the apparatus and a new one substituted therefor.

The provision of the vacuum chamber, it will be observed, enables us to fill bottles with beer or other malt liquors by the vacuum process without producing a perfect vacuum in the vessel to be filled, to do which by mechanical means is almost an impossibility, or, if accomplished, would require much time and labor, and would cause the process to be one of much expense and great tediousness. The presence of the attenuated air in the vessel or bottle to be filled does not act to foam the beer to any appreciable extent, and whatever foam is produced thereby passes into the vacuum-chamber along with said compressed air. Hence, said air and foam being so removed, no fermentation of the beer in the bottle takes place after the same has been completely filled.

If desired, the vacuum-chamber may be provided with an outlet separate from pipe F for discharging such foam; or it may be pumped or exhausted therefrom, or caused to pass out of the chamber H by opening cock $f$ in said pipe F.

The arrangement of the various described vessels and appurtenances, as shown in the drawing, is not an arbitrary one, but only relatively so, as it may be varied to suit the exigencies of each particular case where the apparatus is designed to be used. So, too, while we have described the various openings and closings of the different cocks as being successively effected by hand, we do not wish to be understood as limiting our invention thereto, as a combination of levers may be employed, and arranged to open or close one or more cocks at the same time, or to effect any other desired movement thereof.

What we claim as our invention is—

1. In an organized apparatus for bottling beer or other malt liquors by the vacuum process, the combination of a liquor-holding tank or vessel and an air and a vacuum chamber with exhausting apparatus or pump and suitable pipe-connections and valves, as set forth.

2. The combination of vessel A, vacuum or air chamber H, and pipe C, having cock D, and provided with branches E F, valved at $ef$, substantially as set forth.

3. The pipe C, provided with branches E, F, and G and valves $e, f, g,$ and D, as and for the purpose set forth.

In testimony that we claim the foregoing we have hereunto set our hands this 18th day of October, 1881.

JAMES HUNT.
BENNET C. WILSON.

Witnesses:
ALBERT LUPTON,
WM. MCCOMBS.